United States Patent
Yasunobe

(10) Patent No.: US 10,883,595 B2
(45) Date of Patent: Jan. 5, 2021

(54) OPERATION LEVER COVER FOR WORK VEHICLE, OPERATION MECHANISM FOR WORK VEHICLE, AND WORK VEHICLE

(71) Applicant: Kubota Corporation, Osaka (JP)

(72) Inventor: Daisuke Yasunobe, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/558,278

(22) Filed: Sep. 2, 2019

(65) Prior Publication Data

US 2020/0072344 A1 Mar. 5, 2020

(30) Foreign Application Priority Data

Sep. 3, 2018 (JP) ................................. 2018-164803

(51) Int. Cl.
| | | |
|---|---|---|
| *F16H 59/02* | (2006.01) | |
| *F16J 3/04* | (2006.01) | |
| *G05G 25/04* | (2006.01) | |

(52) U.S. Cl.
CPC .......... *F16H 59/0213* (2013.01); *F16J 3/042* (2013.01); *G05G 25/04* (2013.01)

(58) Field of Classification Search
CPC . F16H 59/0213; F16H 59/0217; G05G 25/04; B23Q 11/0816; B23Q 11/085; F16J 3/04; F16J 3/042; F16J 3/048; F16J 15/52; Y10T 74/2093

See application file for complete search history.

(56) References Cited

U.S. PATENT DOCUMENTS

| | | | | |
|---|---|---|---|---|
| 2,753,008 A | * | 7/1956 | Peirce | G05G 25/04 180/90.6 |
| 3,748,923 A | * | 7/1973 | Babbitt, Jr. | F16J 15/00 74/566 |
| 4,237,998 A | * | 12/1980 | Matayoshi | B60K 20/04 180/89.14 |
| 4,269,282 A | * | 5/1981 | Meacock, II | B60K 20/04 180/328 |

(Continued)

FOREIGN PATENT DOCUMENTS

| | | | | | |
|---|---|---|---|---|---|
| JP | 54061731 A | * | 5/1979 | | |
| JP | 59156830 A | * | 9/1984 | ............... | F16J 15/52 |
| JP | 06270706 A | * | 9/1994 | | |

(Continued)

OTHER PUBLICATIONS

Machine translation of JP 59-156830 A obtained on Feb. 26, 2020.*
Machine translation of JP 6-270706 A obtained on Feb. 26, 2020.*
Machine translation of JP 8-127260 A obtained on Feb. 27, 2020.*

*Primary Examiner* — Adam D Rogers
(74) *Attorney, Agent, or Firm* — Mori & Ward, LLP

(57) ABSTRACT

An operation lever cover for a work vehicle includes a through hole, a trunk, a first attachment part, and a second attachment part. The through hole extends in a first direction. An operation lever of the work vehicle passes through the through hole. The first attachment part is provided at a first end in the first direction of the trunk and has a first attachment surface fitted to a first support surface in a driver's cab of the work vehicle. The second attachment part has a second attachment surface fitted to a second support surface provided separately from the first support surface in the driver's cab.

9 Claims, 12 Drawing Sheets

(56) References Cited

U.S. PATENT DOCUMENTS

| | | | | |
|---|---|---|---|---|
| 5,749,261 A | * | 5/1998 | Numakami | B60K 20/04 464/175 |
| 6,234,044 B1 | * | 5/2001 | Slon | B60K 20/06 277/634 |

FOREIGN PATENT DOCUMENTS

| | | | | |
|---|---|---|---|---|
| JP | 08085356 | A | * | 4/1996 |
| JP | 08127260 | A | * | 5/1996 |
| JP | 2000071797 | A | * | 3/2000 |
| JP | D1281351 | S | | 9/2006 |

* cited by examiner

OPERATION LEVER COVER FOR WORK VEHICLE, OPERATION MECHANISM FOR WORK VEHICLE, AND WORK VEHICLE

CROSS-REFERENCE TO RELATED APPLICATIONS

The present application claims priority under 35 U.S.C. § 119 to Japanese Patent Application No. 2018-164803, filed Sep. 3, 2018. The contents of this application are incorporated herein by reference in their entirety.

BACKGROUND OF THE INVENTION

Field of the Invention

The present application relates to an operation lever cover for a work vehicle and an operation mechanism for a work vehicle, and a work vehicle.

Discussion of the Background

There has been known a work vehicle including a driver's cab, as an agricultural work vehicle (see Japanese Registered Design No. 1281351, for example). The driver's cab is equipped with an operation lever.

SUMMARY OF INVENTION

According to one aspect of the present invention, an operation lever cover for a work vehicle includes a through hole, a trunk, a first attachment part, and a second attachment part. The through hole extends in a first direction. An operation lever of the work vehicle passes through the through hole. The first attachment part is provided at a first end in the first direction of the trunk and has a first attachment surface fitted to a first support surface in a driver's cab of the work vehicle. The second attachment part has a second attachment surface fitted to a second support surface provided separately from the first support surface in the driver's cab.

According to another aspect of the present invention, an operation mechanism for a work vehicle includes a support panel, a first cover, a first operation lever, a second cover, and a second operation lever. The support panel has the first support surface and the second support surface connected to the first support surface. The first cover is configured as the operation lever cover according to the one aspect. The first attachment part in the first cover is attached to the first support surface such that the trunk excluding the first end is disposed above the support panel in a height direction of the work vehicle. The first operation lever passes through the through hole provided in the first cover. The second cover configured as the operation lever cover according to the one aspect. The second attachment part in the second cover is attached to the second support surface such that the trunk excluding the first end is disposed below the support panel in the height direction. The second operation lever passes through the through hole provided in the second cover.

According to further aspect of the present invention, a work vehicle includes the operation lever cover according to the one aspect and an operation lever. The operation lever passes through the through hole provided in the operation lever cover.

According to further aspect of the present invention, a work vehicle includes the operation mechanism according to the another aspect.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
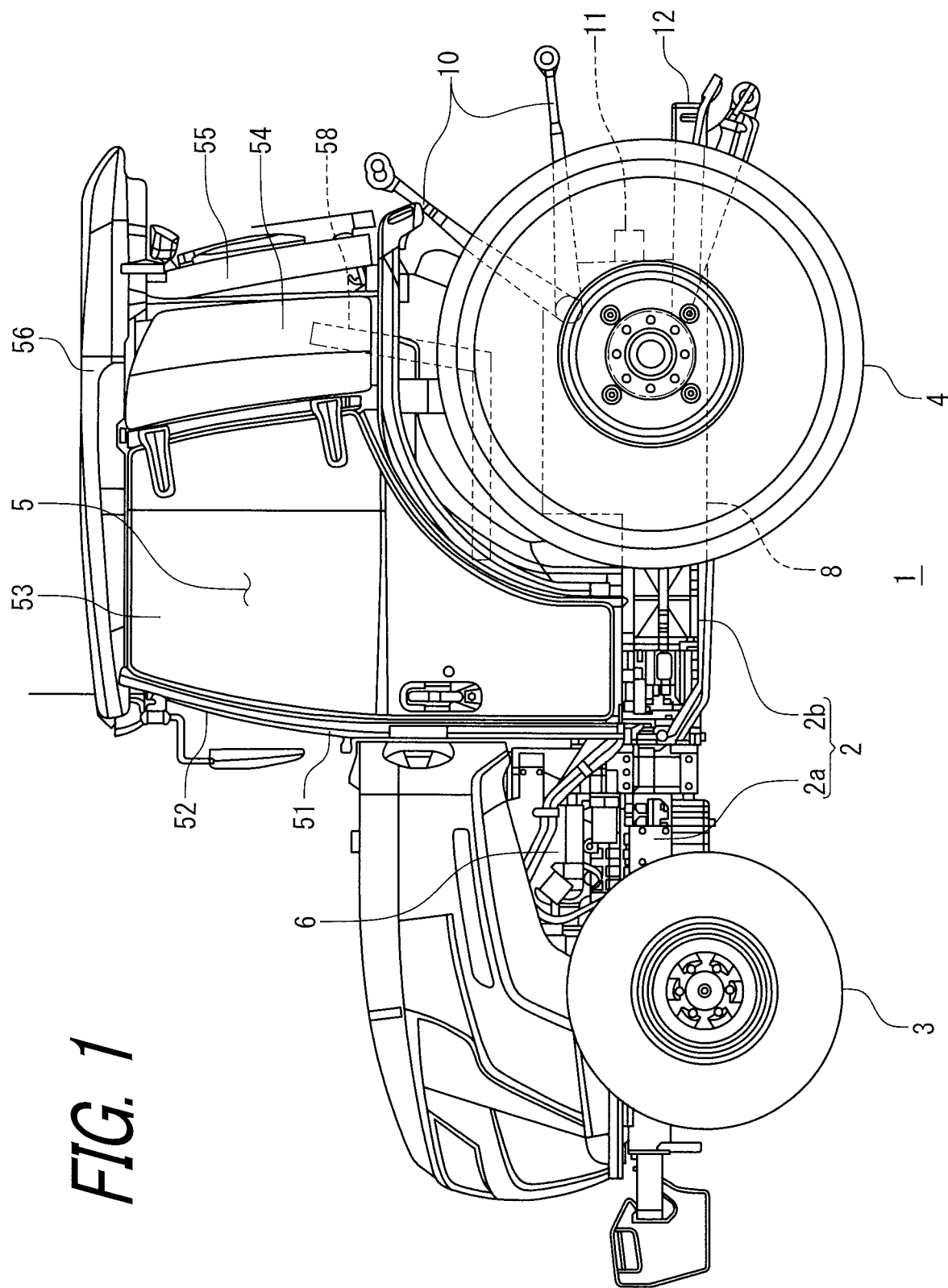
FIG. 1 is a side view of a work vehicle according to an embodiment.

The embodiments will now be described with reference to the accompanying drawings, wherein like reference numerals designate corresponding or identical elements throughout the various drawings.

It is an object of the techniques disclosed in the present application to provide an operation lever cover inhibiting entry of dust and the like to a driver's cab through a hole through which an operation lever passes.

Embodiments will now be described below with reference to the drawings. Same reference signs denote corresponding or identical configurations in the drawings.

First Embodiment

Entire Configuration

FIG. 1 is a side view of a work vehicle 1 according to the embodiment. Examples of the work vehicle 1 include an agricultural tractor. The work vehicle 1 includes a vehicle body frame 2, traveling wheels 3 and 4, and a driver's cab 5. The work vehicle 1 is preferably a four-wheel drive vehicle configured to rotary drive the four traveling wheels 3 and 4 to travel.

The embodiments in the present application refer to an anteroposterior direction indicating an anteroposterior direction viewed from an operator seated on a driver's seat 58 provided in the driver's cab 5. A transverse direction and a lateral direction indicate a transverse direction and a lateral direction viewed from the operator. A vertical direction indicates a vertical direction viewed from the operator. Assume that anteroposterior, transverse (lateral), and height directions of the work vehicle 1 match the anteroposterior, transverse (lateral), and vertical directions viewed from the operator, respectively.

The vehicle body frame 2 includes a front frame 2a and a rear frame 2b. The front frame 2a is provided with an engine 6. The rear frame 2b is provided with the driver's cab 5 and a transmission case 8. The transmission case 8 accommodates a travel gearbox configured to transmit drive power from the engine 6 to the traveling wheels 3 and 4, and the like. The transmission case 8 further accommodates a work device gearbox configured to distribute motive power from the engine 6 to a work device (not depicted) separately from the traveling wheels 3 and 4, a clutch, and the like. The work device gearbox, the clutch, and the like constitute a motive power transmission system to be called a work transmission system.

The work vehicle 1 further includes a pair of lift arms 10, a power take-off shaft (PTO shaft) 11, and a traction device 12. The lift arms 10 are provided respectively on right and left sides of the work vehicle 1 one by one. The lift arms 10 are each configured to swing upward and downward along with operation of a hydraulic lift cylinder included in the work transmission system. The PTO shaft 11 functions as an output shaft for motive power of the work transmission system. The pair of lift arms 10 are coupled to a link mechanism (not depicted), and the PTO shaft 11 is connected to a transmission shaft for transmission of motive power to a work device (not depicted) like a rotary tillage device coupled to the link mechanism. The traction device 12 includes a convey carrier (not depicted) coupled to a rear end of the work vehicle 1 for conveyance.

Internal Configuration of Driver's Cab

Figure 2:
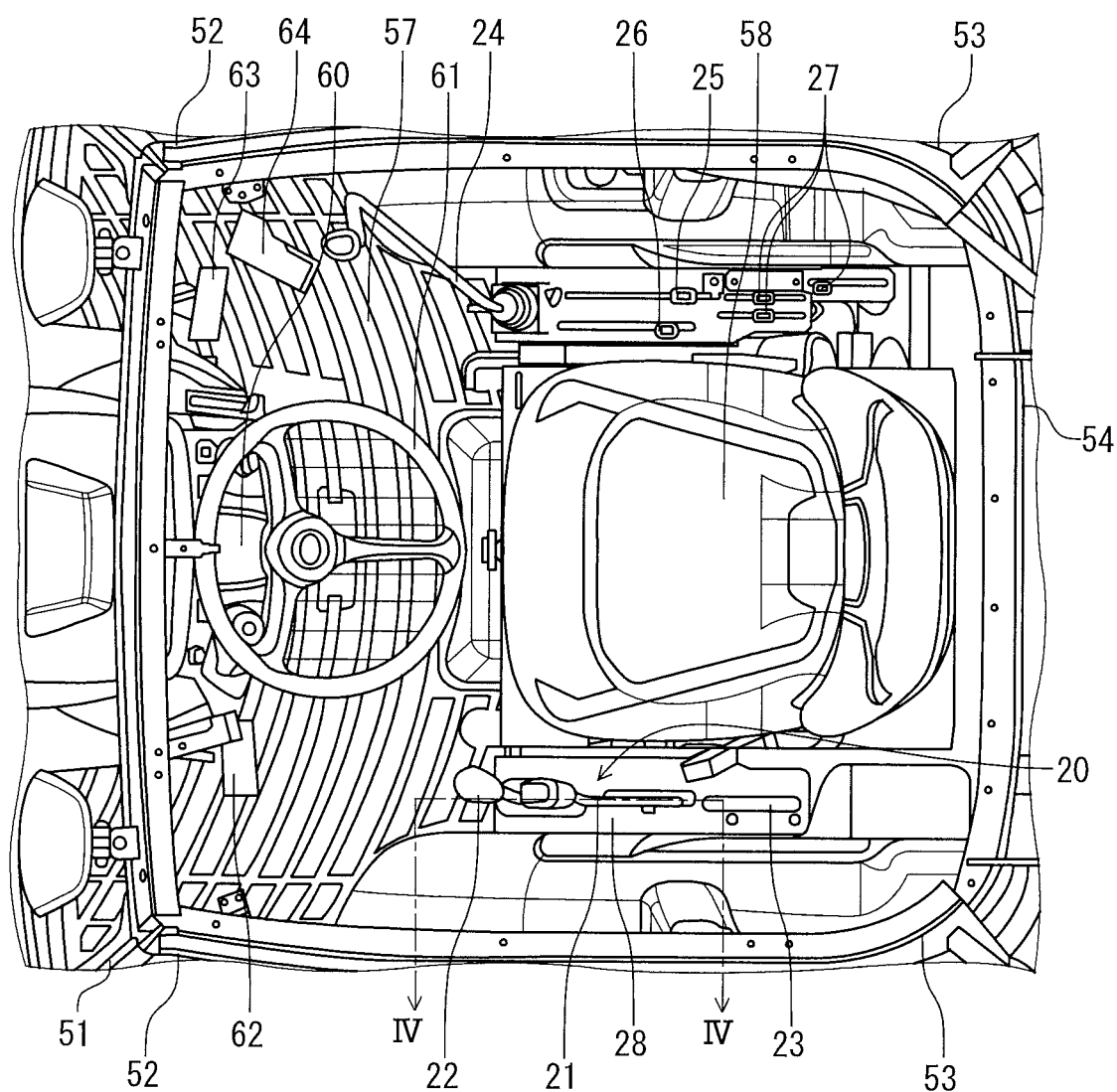
FIG. 2 is a plan view of a driver's cab in the work vehicle.

The driver's cab 5 is a space surrounded with a cabin frame 51, a windshield 52, door panels 53, side windows 54, a rear window 55, and a roof 56. The cabin frame 51 supports the windshield 52, the door panels 53, the side windows 54, the rear window 55, and the roof 56. The roof 56 has an internal storage space for an air conditioner, a wireless communication device, and the like. FIG. 2 is a plan view of an interior of the driver's cab 5 excluding the roof 56. The driver's cab 5 in the work vehicle 1 includes a floor panel 57, and the driver's seat 58. The floor panel 57 constitutes a bottom wall of the driver's cab 5. The floor panel 57 is provided therebehind with the driver's seat 58. The windshield 52 is transparent and constitutes a front end of the driver's cab 5. The door panels 53 are transparent and are provided at right and left ends of the driver's cab 5. The door panels 53 are outwardly openable. Being outwardly openable indicates being openable to be distant from the floor panel 57 and the driver's seat 58. The side windows 54 are transparent and are provided at right and left ends of the driver's cab 5 and behind the door panels 53. The side windows 54 are also outwardly openable. The rear window 55 is transparent and constitutes a rear end of the driver's cab 5. The rear window 55 is also outwardly openable. As depicted in FIG. 2, the work vehicle 1 further includes a display 60, a steering wheel 61, a clutch pedal 62, a brake pedal 63, a speed control pedal 64, and the like, which are disposed behind the windshield 52 and ahead of the driver's seat 58.

The work vehicle 1 includes an operation mechanism 20 disposed on the left of the driver's seat 58 in the driver's cab 5. The operation mechanism 20 includes a first operation lever 21, a second operation lever 22, and a third operation lever 23. The operation mechanism 20 may not necessarily include the third operation lever 23. The third operation lever 23 may alternatively be disposed at a location other than the left side of the driver's seat 58. The first operation lever 21 is preferably configured as a shuttle shift lever. The first operation lever 21 is swingable in an anteroposterior direction. The first operation lever 21 tilted forward causes the work vehicle 1 to travel forward. The first operation lever 21 tilted backward causes the work vehicle 1 to travel backward. The second operation lever 22 is preferably configured to set whether or not to drive front wheels (the traveling wheels 3). The second operation lever 22 is disposed ahead of the first operation lever 21. The second operation lever 22 is swingable in an anteroposterior direction. When the second operation lever 22 is tilted forward, the front wheels 3 may be driven to achieve four-wheel drive travel of the work vehicle 1 ("4WD ON"). When the second operation lever 22 is tilted backward, only rear wheels 4 may be driven to achieve two-wheel drive travel of the work vehicle 1 ("4WD OFF"). The second operation lever 22 may alternatively be configured to turn OFF four-wheel drive when being tilted forward and turn ON four-wheel drive when being tilted backward. The third operation lever 23 is configured as a gear shift lever. The first operation lever 21 preferably has three gear levels of LOW, MIDDLE, and HIGH, which are selected for low-speed travel, middle-speed travel, and high-speed travel, respectively. The third operation lever 23 is slidable in an anteroposterior direction. The third operation lever 23 may be slid forward to set the gear level to LOW. The third operation lever 23 may be slid to the middle to set the gear level to MIDDLE. The third operation lever 23 may be slid backward to set the gear level to HIGH. The third operation lever 23 may alternatively be configured to set the gear level to HIGH when slid forward and set the gear level to LOW when slid backward. The second and third operation levers 22 and 23 are mechanically connected to the travel gearbox and the like accommodated in the transmission case 8. Each of the second and third operation levers 22 and 23 may alternatively be electrically connected, via a switch or the like, to the travel gearbox and the like accommodated in the transmission case 8.

The work vehicle 1 includes a fourth operation lever 24, a fifth operation lever 25, a sixth operation lever 26, and seventh operation levers 27, which are disposed on the right of the driver's seat 58 in the driver's cab 5. The fourth operation lever 24 is relevant to the work transmission system (output from the PTO shaft 11). The fifth operation lever 25 is configured to vertically shift the work device (not depicted). The fifth operation lever 25 is swingable in an anteroposterior direction. When the fifth operation lever 25 is tilted backward, the lift arms 10 may shift the work device upward. When the fifth operation lever 25 is tilted forward, the lift arms 10 may shift the work device downward. Alternatively, the fifth operation lever 25 tilted backward may cause the lift arms 10 to shift the work device downward, and the fifth operation lever 25 tilted forward may cause the lift arms 10 to shift the work device upward. The sixth operation lever 26 is configured to set for control of the lift arms 10 to shift the work device vertically in accordance with unevenness or hardness of soil (cause the work device to follow change of soil) for achievement of constant tractive force of the work device as much as possible, or to set for control of the lift arms 10 not to cause the work device to follow such change of soil. The sixth operation lever 26 is swingable in an anteroposterior direction. When the sixth operation lever 26 is tilted backward, the work vehicle 1 may control the lift arms 10 to cause the work device to follow change of soil. When the sixth operation lever 26 is tilted forward, the work vehicle 1 may controls the lift arms 10 not to cause the work device to follow change of soil. The work vehicle 1 is also configured to control the lift arms 10 to float the work device above soil. When the sixth operation lever is further tilted forward from a position for not causing the work device to follow change of soil, the work vehicle 1 may control the lift anus 10 to float the work device above soil. The seventh operation levers 27 include levers configured to directly control the lift cylinders of the lift arms 10.

Details of Operation Mechanism

Figure 3:
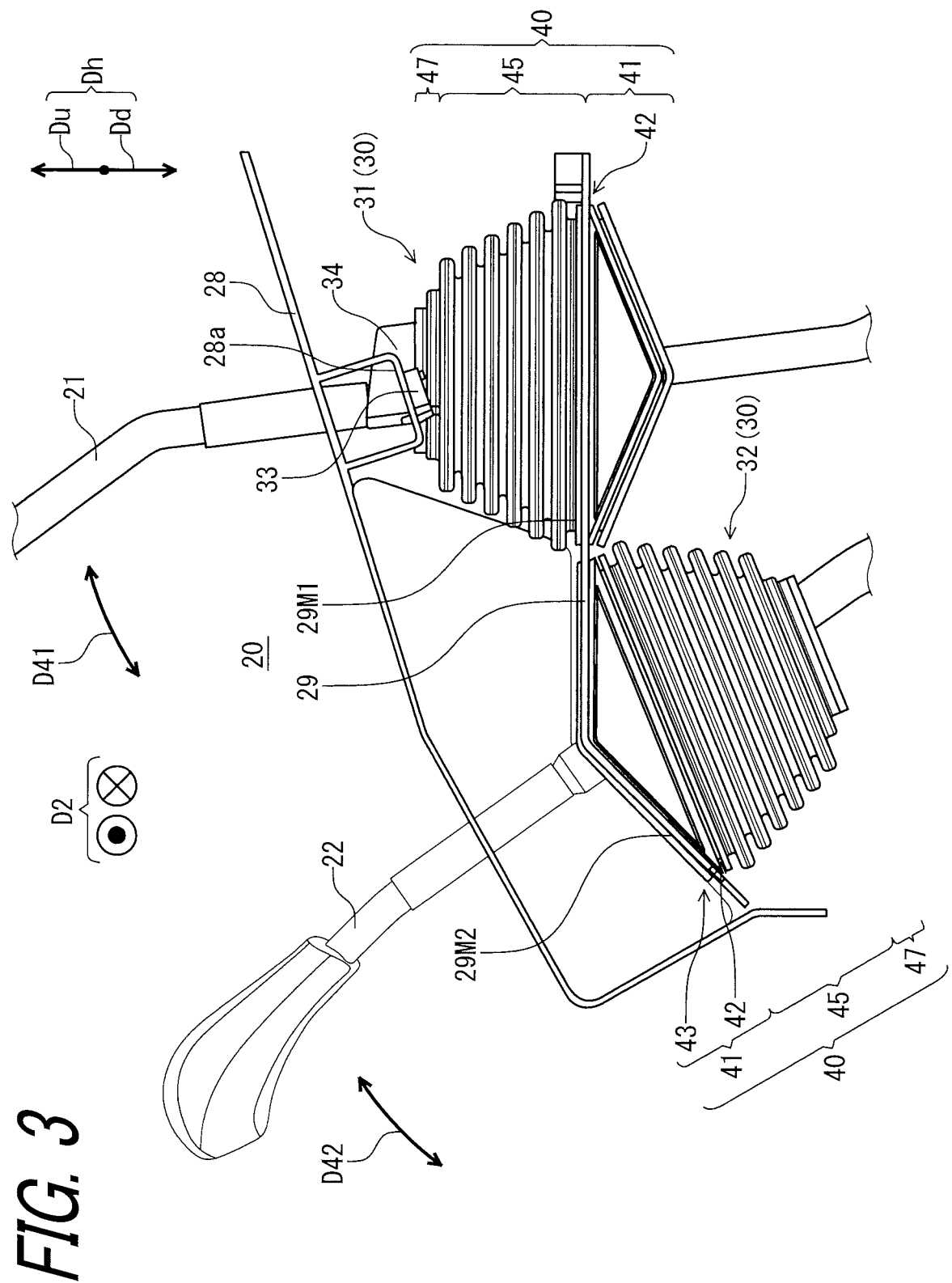
FIG. 3 is a side view of a portion adjacent to a first operation lever and a second operation lever.

FIG. 3 is an enlarged side view of a portion adjacent to the first operation lever 21 and the second operation lever 22 in the operation mechanism 20. With reference to FIG. 3, the operation mechanism 20 further includes a guide panel 28, a support panel 29, a first cover 31, and a second cover 32. The operation mechanism may further include a switch 33 and an actuation plate 34. The guide panel 28 includes openings (guide holes) defining shift ranges of the first operation lever 21 and the second operation lever 22, to guide anteroposterior shift of the first operation lever 21 and the second operation lever 22.

The guide panel 28 further suspends the switch 33. Specifically, the guide panel 28 has a projection 28a extending toward the support panel 29, and the switch 33 is mounted to the projection 28a. The switch 33 is accordingly disposed adjacent to the first operation lever 21. The actuation plate 34 is connected to the first operation lever 21 and is configured to swing along with the first operation lever 21. The actuation plate 34 is preferably bonded to the first operation lever 21 by welding or the like. The actuation plate 34 preferably has an L shape when viewed from above for better adhesion to the first operation lever 21 (see FIG. 7). The actuation plate 34 may alternatively have a U shape surrounding the first operation lever 21, or a tabular shape. The projection 28a is formed to dispose the switch 33 and the actuation plate 34 adjacent to each other. The switch 33 and the actuation plate 34 may be connected to each other via a flat spring SP or the like as exemplarily depicted in FIG. 7. The switch 33 and the actuation plate 34 may alternatively be mechanically connected to each other via a projection provided at the actuation plate 34. Manipulation of the first operation lever 21 accordingly causes the actuation plate 34 to shift to turn ON or OFF the switch 33. The switch 33 is electrically connected to the travel gearbox and the like accommodated in the transmission case 8, and outputs an ON/OFF signal transmitted to the gearbox and the like. When the first operation lever 21 is tilted backward, the switch 33 is turned ON to set the travel gearbox for backward travel of the work vehicle 1. When the first operation lever 21 is tilted forward, the switch 33 is turned OFF to set the travel gearbox for forward travel of the work vehicle 1. Alternatively, the switch 33 may be turned ON to set the travel gearbox for forward travel of the work vehicle 1 when the first operation lever 21 is tilted forward, and the switch 33 may be turned OFF to set the travel gearbox for backward travel of the work vehicle 1 when the first operation lever 21 is tilted backward.

The support panel 29 supports the first cover 31 and the second cover 32. The support panel 29 has a first support surface 29M1 and a second support surface 29M2 provided continuously from the first support surface 29M1. The second support surface 29M2 is different from the first support surface 29M1. Specifically, the second support surface 29M2 is different in shape from the first support surface 29M1. The first support surface 29M1 has a planar shape and the second support surface 29M2 has a convex shape in the present embodiment. With reference to FIG. 3, the second support surface 29M2 has an inverted V sectional shape. The second support surface 29M2 may alternatively be curved to bulge upward. The operation mechanism 20 may not necessarily include the guide panel 28.

Figure 4:
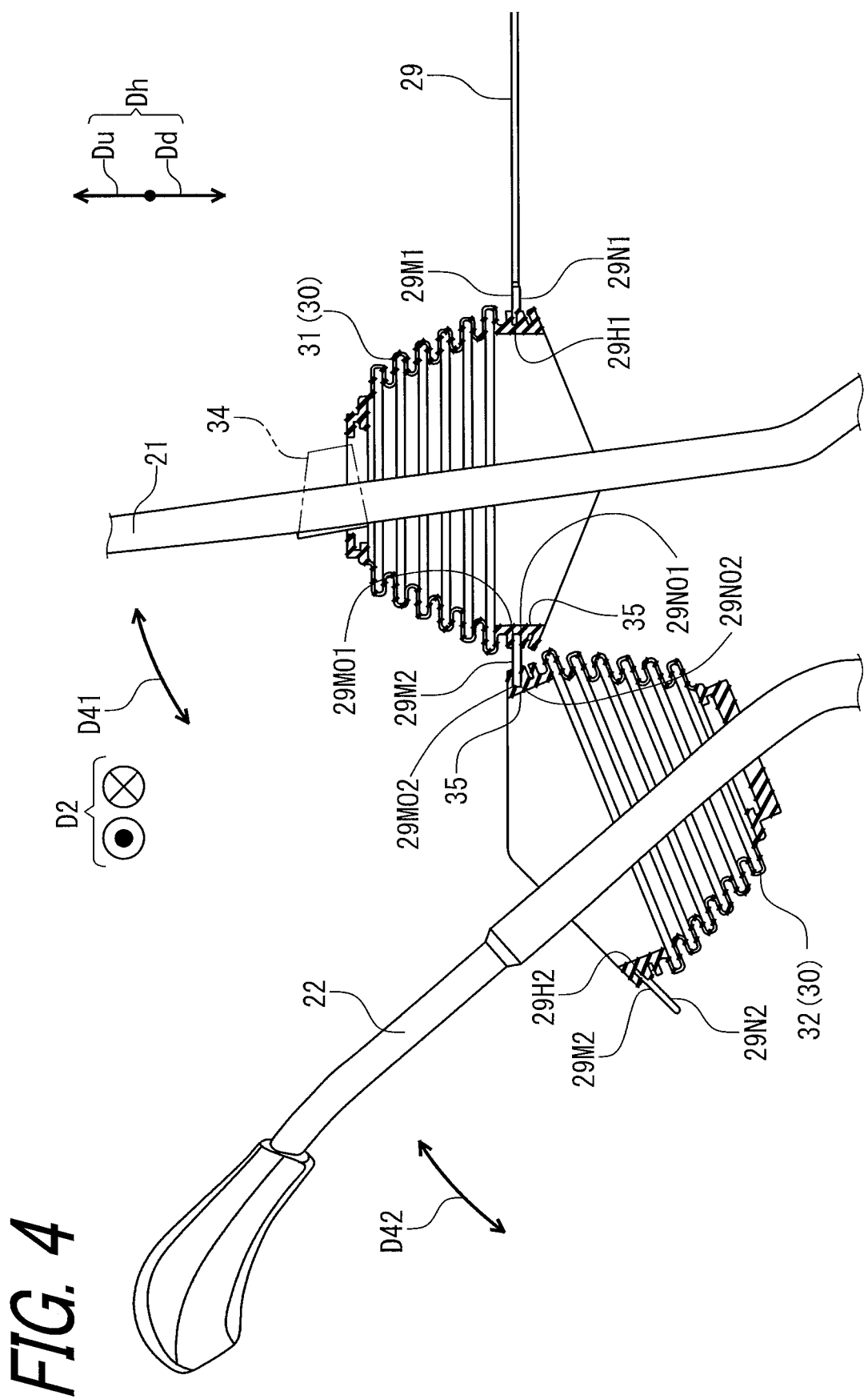
FIG. 4 is a sectional view taken along line IV-IV indicated in FIG. 2, of the first and second operation levers and covers thereof according to a first embodiment.

As depicted in FIG. 4, the support panel 29 has a first panel through hole 29H1 through which the first operation lever 21 can pass, and a second panel through hole 29H2 through which the second operation lever 22 can pass. The first support surface 29M1 has a first support surface opening 29M01. A rear surface 29N1 of the first support surface 29M1 has a first rear support surface opening 29N01. The first panel through hole 29H1 extends from the first support surface opening 29M01 to the first rear support surface opening 29N01. The second support surface 29M2 has a second support surface opening 29M02. A rear surface 29N2 of the second support surface 29M2 has a second rear support surface opening 29NO2. The second panel through hole 29H2 extends from the second support surface opening 29M02 to the second rear support surface opening 29NO2. The first cover 31 closes most of the first panel through hole 29H1 to inhibit entry of dust and the like to the driver's cab 5 through the first panel through hole 29H1. The second cover 32 closes most of the second panel through hole 29H2 to inhibit entry of dust and the like to the driver's cab 5 through the second panel through hole 29H2. The first cover 31 and the second cover 32 are configured substantially identically. Each of the first cover 31 and the second cover 32 will thus be generally called an operation lever cover 30. A structure in common between the first cover 31 and the second cover 32 will be initially described below and a structure unique to the second cover 32 will be described subsequently.

Structure in Common Between First Cover 31 and Second Cover 32

Figure 5:
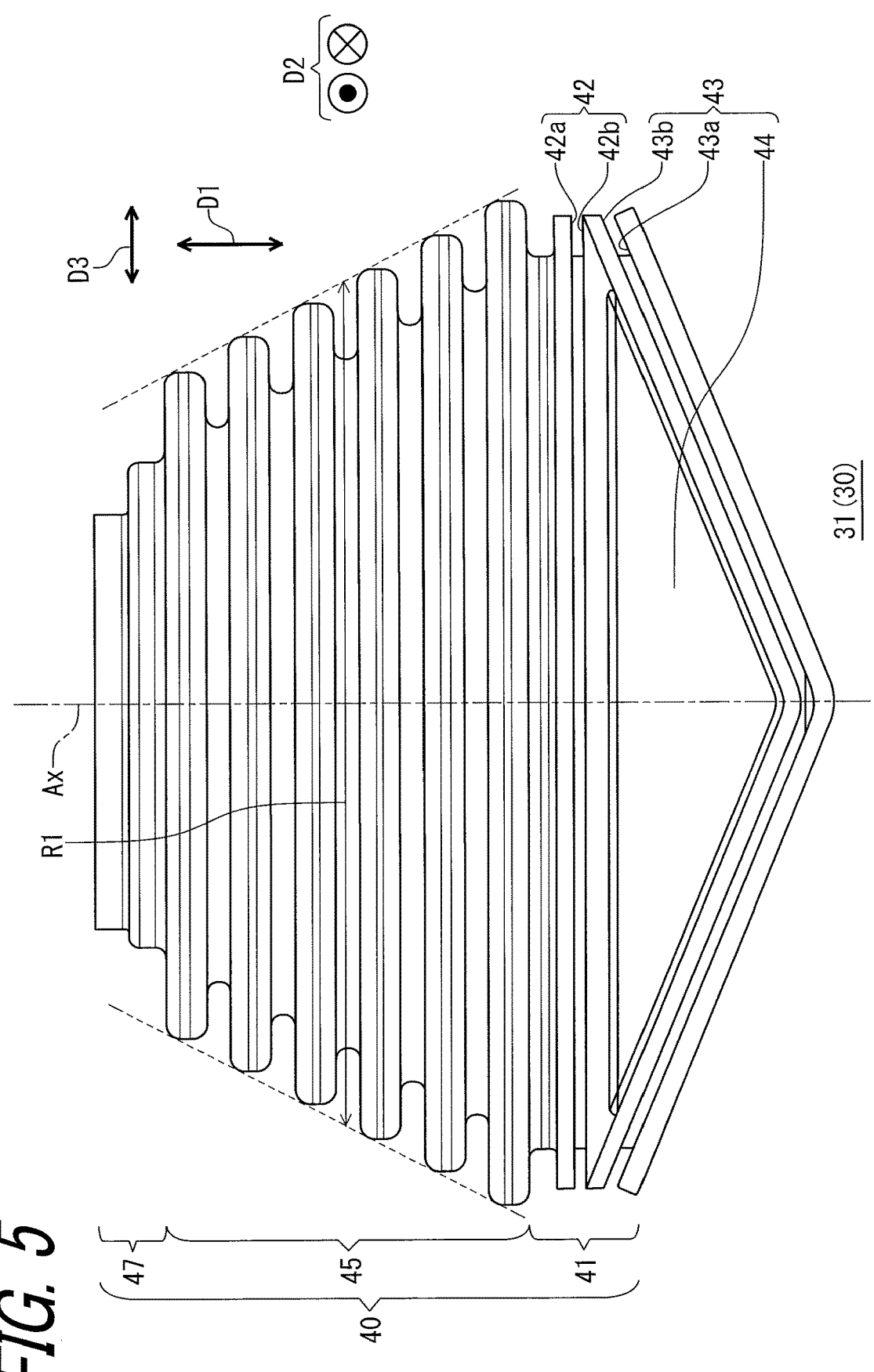
FIG. 5 is a side view of an operation lever cover (first cover) according to the first embodiment.

With reference to FIG. 5, the operation lever cover 30 of the work vehicle 1 includes a trunk 40, a first attachment part 42, and a second attachment part 43. The trunk 40 has a bellows part 45. The trunk 40 accordingly has a bellows shape. The trunk 40 has a first end 41 and a second end 47 in a first direction D1 The second end 47 opposes the first end 41 in the first direction D1. The bellows part 45 is disposed between the first end 41 and the second end 47 in the first direction D1.

The first attachment part 42 is provided at the first end 41. With reference to FIGS. 4 and 5, the first attachment part 42 has a first attachment surface 42a fitted to the first support surface 29M1. The first attachment part 42 preferably has a third attachment surface 42b fitted to a rear surface 29N1 of the first support surface 29M1 of the support panel 29. As depicted in FIG. 3, the first attachment part 42 of the first cover 31 in the operation mechanism 20 is attached to the first support surface 29M1 such that the trunk 40 (the bellows part 45 and the second end 47) excluding the first end 41 is disposed above Du the support panel 29 in a height direction Dh of the work vehicle 1.

With reference to FIG. 5, the second attachment part 43 has a second attachment surface 43a fitted to the second support surface 29M2. The second attachment part 43 preferably has a fourth attachment surface 43b fitted to a rear surface 29N2 (see FIG. 4) of the second support surface 29M2 of the support panel 29. The second attachment surface 43a and the fourth attachment surface 43b have a positional relation in the first direction D1 opposite to a positional relation between the first attachment surface 42a and the third attachment surface 42b in the first direction D1. The second attachment part 43 is preferably provided at the first end 41. The first attachment part 42 is disposed between the second end 47 and the second attachment part 43 in the first direction D1. As depicted in FIG. 3, the second attachment part 43 of the second cover 32 in the operation mechanism 20 is attached to the second support surface 29M2 such that the trunk 40 (the bellows part 45 and the second end 47) excluding the first end 41 is disposed below Dd the support panel 29 in the height direction Dh of the work vehicle 1. More specifically, the trunk 40 (the bellows part 45, the second end 47, and the first attachment part 42) excluding the second attachment part 43 is disposed below Dd the support panel 29 in the height direction Dh of the work vehicle 1.

The second attachment part 43 may not necessarily be provided at the first end 41, but may alternatively be provided at the second end 47. In this case, the second attachment part 43 is attached to the second support surface 29M2 such that the trunk 40 (the bellows part 45, the second end 47, and the first attachment part 42) excluding the second attachment part 43 is disposed above Du the support panel 29 in the height direction Dh of the work vehicle 1.

Figure 6:
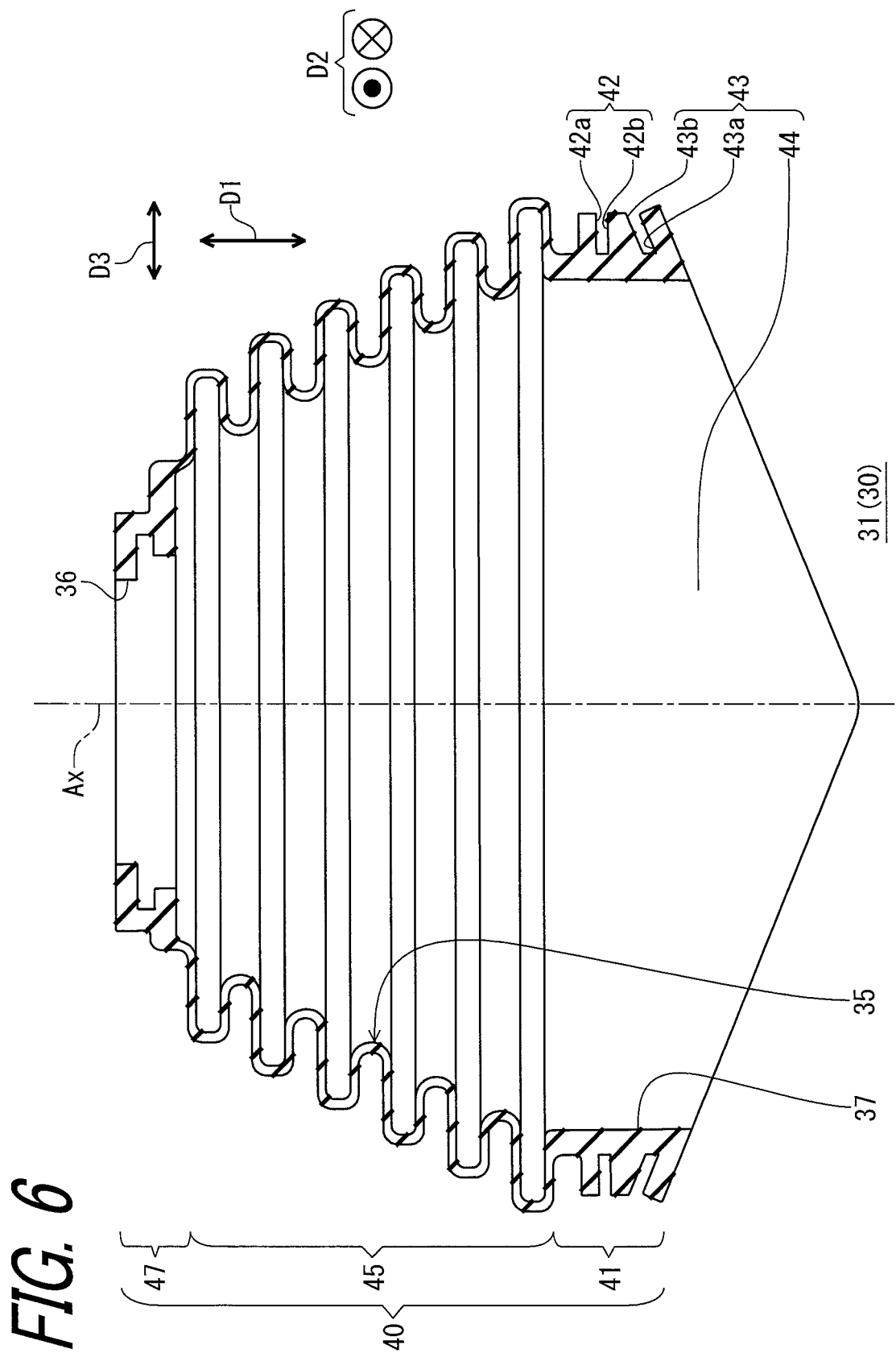
FIG. 6 is a sectional view of the operation lever cover (first cover) taken along line VI-VI indicated in FIG. 7.

With reference to FIG. 6, the operation lever cover 30 of the work vehicle 1 has a through hole 35. The through hole 35 extends in the first direction D1 such that the first operation lever 21 (the second operation lever 22) of the work vehicle 1 can pass through the through hole 35. As depicted in FIG. 4, in the operation mechanism 20, the first operation lever 21 passes through the through hole 35 in the first cover 31 whereas the second operation lever 22 passes through the through hole 35 in the second cover 32. The trunk 40 surrounds the through hole 35. The through hole 35 has a hole center axis Ax.

Figure 7:
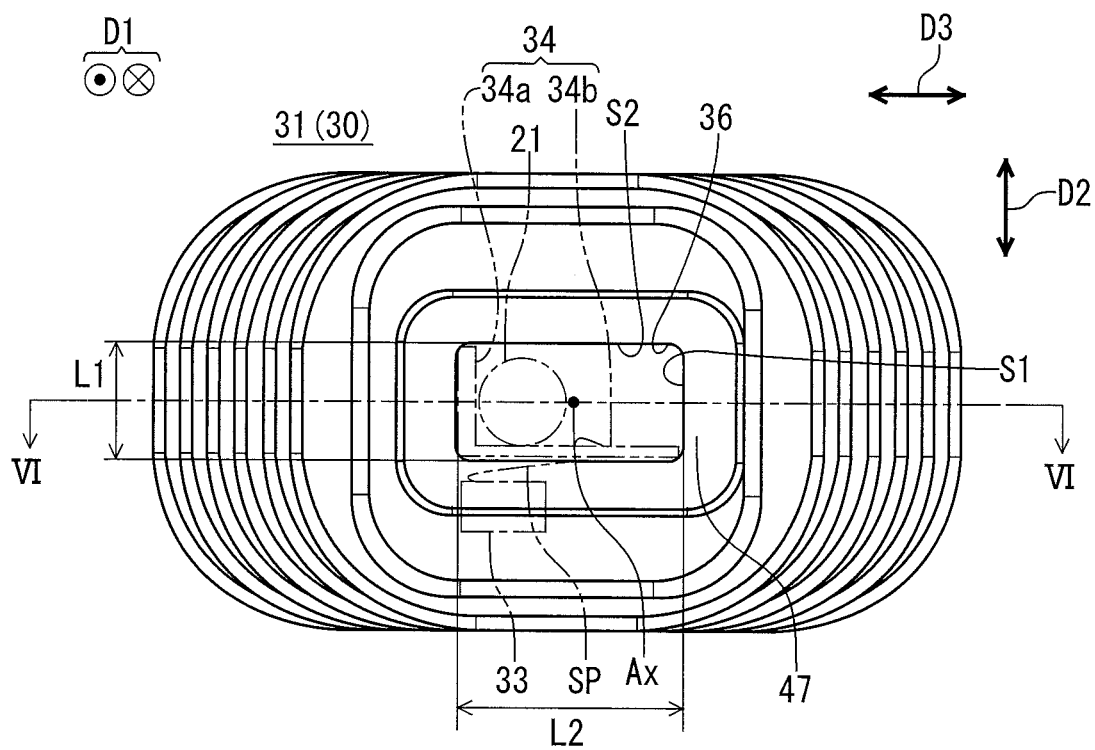
FIG. 7 is a top view of the operation lever cover (first cover) according to the first embodiment.

With reference to FIG. 7, the through hole 35 at the second end 47 has an opening 36 in a substantially rectangular shape when viewed in the first direction D1. As depicted in FIG. 7, the substantially rectangular shape of the opening 36 may have rounded corners. The opening 36 in the substantially rectangular shape has short sides S1 and long sides S2. The short sides S1 extend in a second direction D2 substantially perpendicular to the first direction D1. The long sides S2 extend in a third direction D3 substantially perpendicular to the first direction D1 and the second direction D2. As depicted in FIGS. 3 and 4, the first cover 31 is preferably attached to the support panel 29 such that the second direction D2 along the short sides S1 is substantially perpendicular to a direction D41 along which the first operation lever 21 swings. The first cover 31 disposed in this manner causes the direction D41 to be along the third direction D3 when viewed in the first direction D1 and allows the first cover 31 to easily follow motion of the first operation lever.

As depicted in FIGS. 3, 4, and 7, the actuation plate 34 passes through the opening 36 of the through hole 35 at the second end 47. As depicted in FIG. 3, the switch 33 is at least partially disposed above Du the first cover 31. This enables reduction in length of the flat spring SP between the actuation plate 34 positioned above the opening 36 and the switch 33 and achieves linear disposition of the flat spring SP. As depicted in FIG. 7, the actuation plate 34 in the L shape includes a first tabular part 34a and a second tabular part 34b substantially perpendicular to the first tabular part 34a. The actuation plate 34 is disposed with respect to the first cover 31 such that the first tabular part 34a is along the short sides S1 of the opening 36 and the second tabular part 34b is along the long sides S2 of the opening 36. In a state where the first cover 31 is mounted to the operation mechanism 20, the first tabular part 34a has a length in the second direction D2 substantially equal to a length L1 of the short sides S1. The second tabular part 34b has a length in the third direction D3 substantially equal to a length L2 of the long sides S2. Specifically, the opening 36 of the through hole 35 at the second end 47 has a minimum size corresponding to a size of the actuation plate 34. The first cover 31 can thus inhibit entry of dust and the like to the driver's cab 5 through the first panel through hole 29H.

Figure 8:
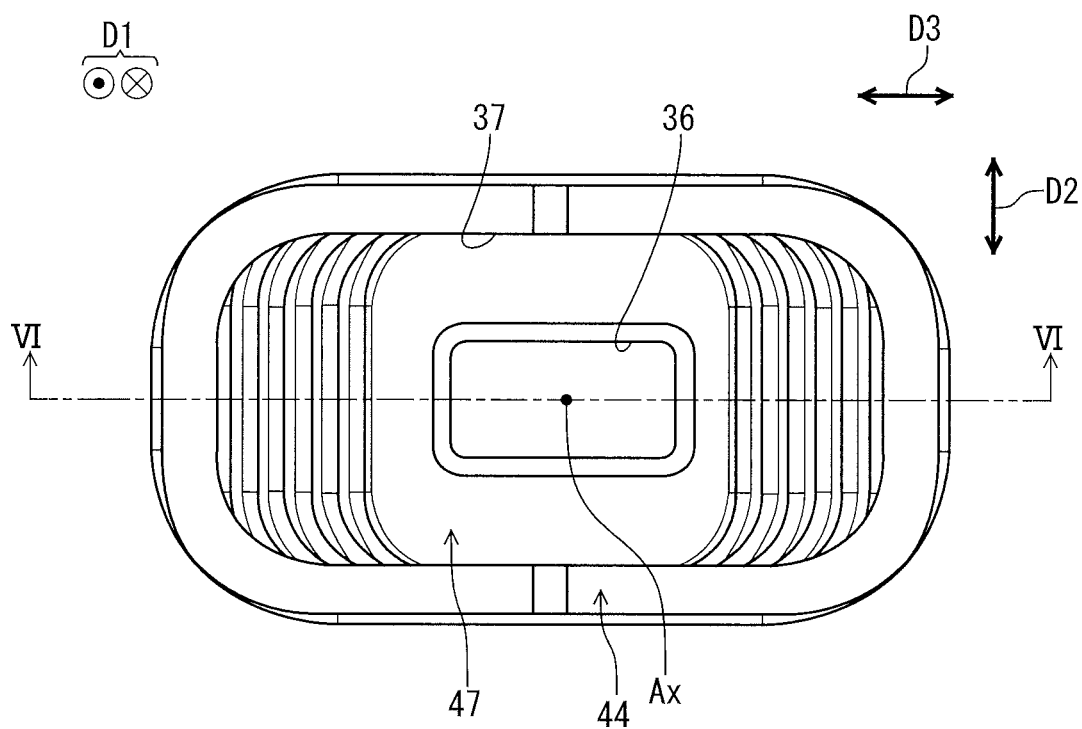
FIG. 8 is a bottom view of the operation lever cover (first cover) according to the first embodiment.

With reference to FIG. 8, the through hole 35 at the first end 41 has an opening 37 in a substantially rectangular shape when viewed in the first direction D1. The opening 37 is larger in size than the opening 36. The opening 37 is substantially similar in shape to the opening 36. The opening 37 has rounded corners larger than the rounded corners of the opening 36.

With reference to FIG. 5, the second attachment surface 43a is more distant from the first attachment surface 42a as coming closer to the hole center axis Ax when viewed in a direction (the second direction D2) perpendicular to the hole center axis Ax. The second attachment part 43 has a first additional trunk 44 disposed between the first attachment surface 42a and the second attachment surface 43a when viewed in the direction (the second direction D2) perpendicular to the hole center axis Ax. The first additional trunk 44 does not necessarily have a substantially triangular shape as depicted in FIG. 5. The bellows part 45 has an outer dimension R1 in the third direction D3, and the outer dimension R1 gradually decreases from the first end 41 to the second end 47. The outer dimension R1 of the trunk 40 gradually decreases from the first end 41 to the second end 47.

Figure 9:
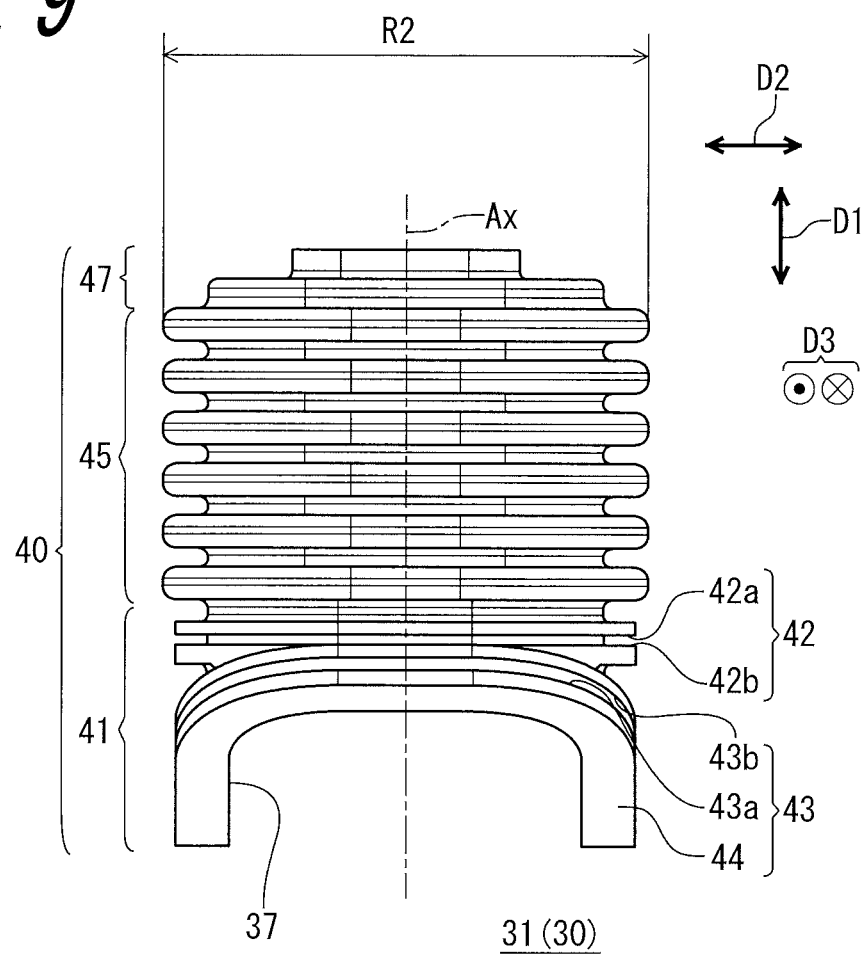
FIG. 9 is a front view of the operation lever cover (first cover) according to the first embodiment.

As depicted in FIG. 9, the second attachment surface 43a gradually approaches the first attachment surface 42a as coming closer to the hole center axis Ax when viewed in the third direction D3. The bellows part 45 has an outer dimension R2 in the second direction D2, and the outer dimension R2 is substantially constant.

Structure Unique to Second Cover 32

Figure 10:
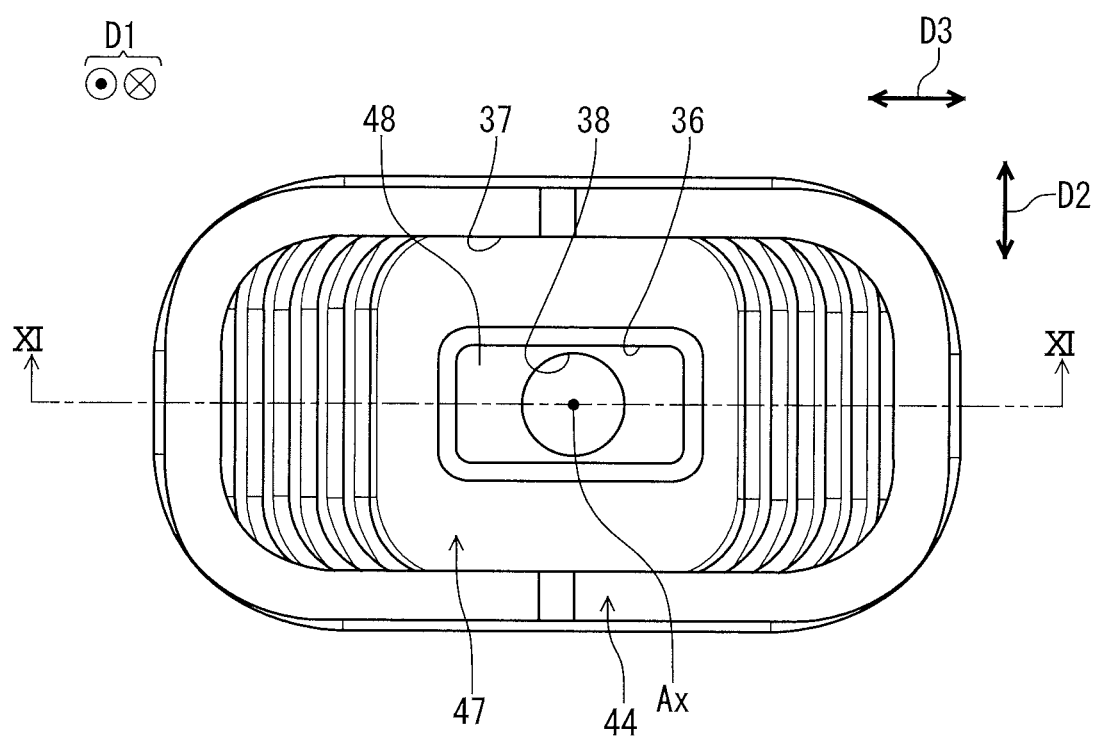
FIG. 10 is a bottom view of an operation lever cover (second cover).
Figure 11:
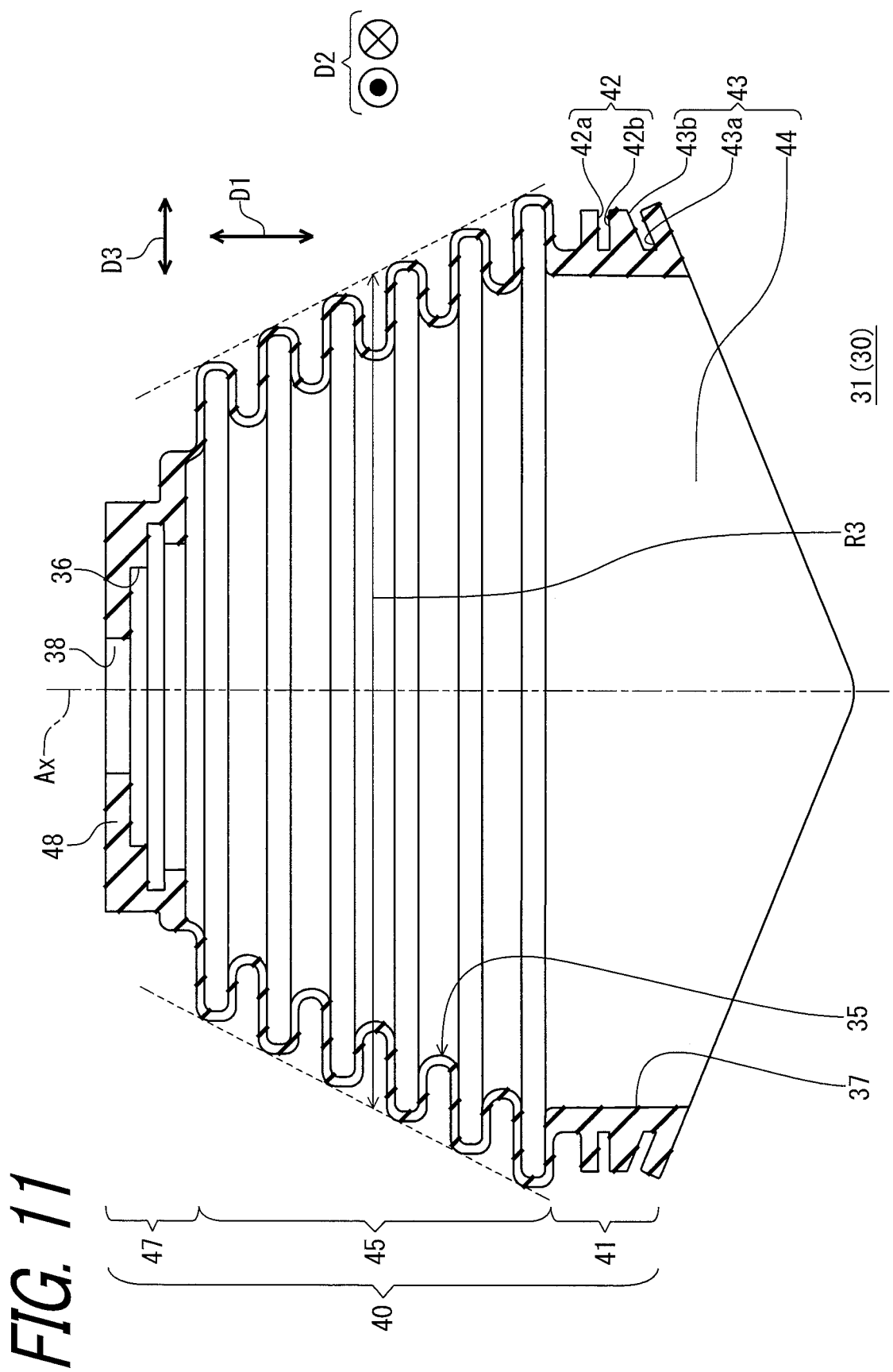
FIG. 11 is a sectional view of the operation lever cover (second cover) taken along line XI-XI indicated in FIG. 10.
Figure 12:
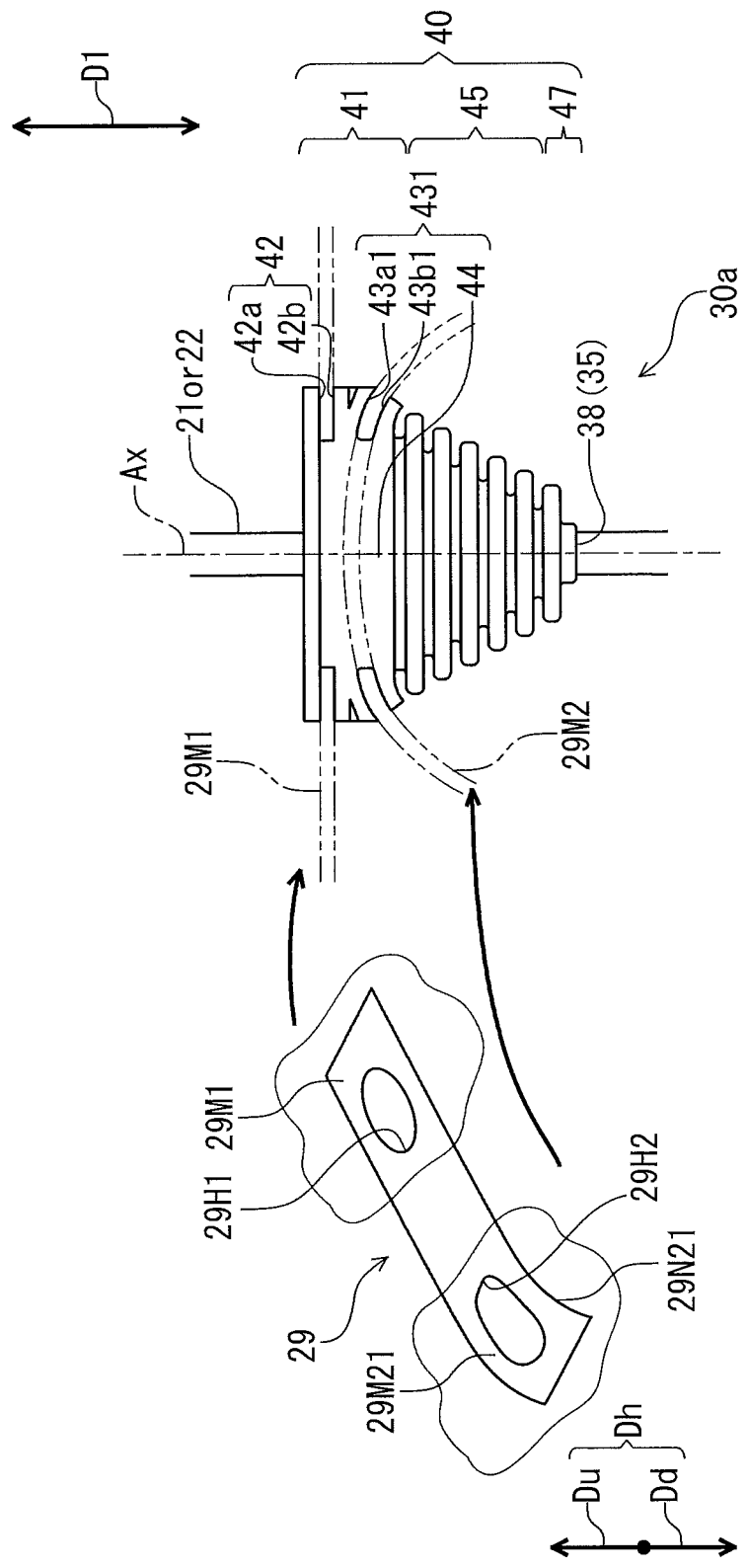
FIG. 12 is a schematic view of an operation mechanism including an operation lever cover and an operation lever wearing the cover according to a second embodiment.

FIG. 10 is a bottom view of the second cover 32. Comparing FIG. 8 with FIG. 10, the second cover 32 is different from the first cover 31 in that the second end 47 further includes a second additional trunk 48. The operation lever cover 30 of the work vehicle 1 may further include the second additional trunk 48 provided at the second end 47. With reference to FIGS. 10 and 11, the second additional trunk 48 has an aperture 38 in communication with the opening 36. The aperture 38 is preferably sized such that the second operation lever 22 is in sliding contact with the aperture 38. The second cover 32 can thus inhibit entry of dust and the like to the driver's cab 5 through the second panel through hole 29142. The second operation lever 22 has a columnar shape, and the aperture 38 accordingly has a circular shape when viewed in the first direction D1. The shape viewed in the first direction D1 of the aperture 38 is not limited to this circular shape, but the aperture 38 can have any other shape corresponding to the sectional shape of the second operation lever 22. The remaining portion of the second cover 32 is structured identically to the first cover 31.

Method of Producing First Cover 31 and Second Cover 32

The operation lever cover 30 is made of an elastic material such as rubber, and is preferably produced by pouring a liquid elastic material into a mold. The trunk 40, the first attachment part 42, and the second attachment part 43 are thus molded integrally. More specifically, the trunk 40 including the second additional trunk 48, the first attachment part 42, and the second attachment part 43 including the first additional trunk 44 are molded integrally. Alternatively, the first cover 31 may be obtained by producing the second cover 32 with use of a mold for the second cover 32 and cutting off the second additional trunk 48. Production in this manner enables reduction in the number of molds and achieves production cost reduction.

When there are separately prepared a mold for the first cover 31 and the mold for the second cover 32, the second end 47 of the second cover 32 may not necessarily have the opening 36.

Advantages of Covers According to the Present Embodiment

The operation lever covers 30 according to the present embodiment each include the first attachment part 42 and the second attachment part 43 corresponding to the first support surface 29M1 and the second support surface 29M2, respectively, so as to be mounted on a variety of support surfaces. The covers 30 each include the opening 36 and the aperture 38 sized as small as possible, to inhibit entry of dust and the like to the driver's cab through the holes through which the operation levers 21 and 22 can pass.

Second Embodiment

Each of the operation lever covers 30 according to the present application is not limited to that disclosed in the first embodiment, but may alternatively include the first attachment part 42 and the second attachment part 43 replaced with each other. Described below in terms of a configuration is an operation lever cover 30a according to the present embodiment. Portions similar to those in the operation lever cover 30 according to the first embodiment will be denoted by identical reference signs and will not be described repeatedly.

The operation lever cover 30a includes the through hole 35, the trunk 40, the first attachment part 42, and a second attachment part 431. The second attachment part 431 is provided at the first end 41 as in the first embodiment. The second attachment part 431 is different from the second attachment part 43 according to the first embodiment in that the second attachment part 431 is disposed between the first attachment part 42 and the bellows part 45 when viewed in the first direction D1. The second attachment part 431 is disposed between the first attachment part 42 and the second end 47 in the first direction D1. The second attachment part 431 has a second attachment surface 43a1 fitted to a second support surface 29M21. The second support surface 29M21 has a convex shape. More specifically, the second support surface 29M21 is curved to bulge upward. The second support surface 29M21 may alternatively have an inverted V sectional shape as in the first embodiment. The second attachment surface 43a1 thus gradually approaches the first attachment surface 42a as coming closer to the hole center axis Ax of the through hole 35. The second attachment part 431 also has a fourth attachment surface 43b1 fitted to a rear surface 29N21 of the second support surface 29M21. Unlike the first embodiment, the second attachment surface 43a1 and the fourth attachment surface 43b1 have a positional relation in the first direction D1 similar to the positional relation between the first attachment surface 42a and the third attachment surface 42b in the first direction D1.

Unlike the first embodiment, the first attachment part 42 of the first cover 31 is attached to the first support surface 29M1 such that the trunk 40 (the bellows part 45 and the second end 47) excluding the first end 41 is disposed below Dd the support panel 29 in the height direction Dh of the work vehicle 1. The second end 47 is provided with only the aperture 38 and does not have the opening 36. The remaining portions in the operation lever cover 30a are similar to those in the operation lever cover 30 according to the first embodiment. The operation lever cover 30a according to the second embodiment is advantageous similarly to the operation lever cover 30 according to the first embodiment.

The present application refers to words "include" and derivatives as nonrestrictive terms for description of provision of constituent elements, without exclusion of any other constituent element not referred to in the present application. The same applies to words "have", "provided with", and derivatives thereof.

Expressions "member", "part", "element", "body", and "structure" may have a plurality of meanings indicating a single portion and a plurality of portions.

Ordinal numbers "first", "second", and the like are terms for simple distinction among configurations, without having any other meaning (e.g. specific order). For example, provision of a "first element" does not indicate provision of a "second element", and provision of the "second element" does not indicate provision of the "first element".

Expressions "substantially", "approximately", "about", and the like indicating degrees may each have a rational deviation not significantly changing a final result. All the numerical values referred to in the present application may be interpreted as including any one of the expressions "substantially", "approximately", "about", and the like.

In view of the above disclosure, the present invention can obviously include various modifications and alterations. The present invention may thus be implemented in any manner different from those specifically disclosed in the present application without departing from the spirit of the preset invention.

Obviously, numerous modifications and variations of the present invention are possible in light of the above teachings. It is therefore to be understood that within the scope of the appended claims, the invention may be practiced otherwise than as specifically described herein.

What is claimed is:

1. An operation lever cover for a work vehicle, comprising:
    a through hole extending in a first direction, an operation lever of the work vehicle being configured to pass through the through hole;
    a trunk having a bellows shape and surrounding the through hole;
    a first attachment part provided at a first end in the first direction and having a first attachment surface configured to be fitted to a first support surface in a driver's cab of the work vehicle; and
    a second attachment part having a second attachment surface configured to be fitted to a second support surface provided separately from the first support surface in the driver's cab, wherein the second attachment part is provided at the first end, wherein the trunk has a second end opposite to the first end in the first direction, wherein the first attachment part is provided between the second end and the second attachment part in the first direction, wherein the first attachment surface is configured to be fitted to the first support surface having a planar shape, wherein the second attachment surface is configured to be fitted to the second support surface having a convex shape, wherein the through hole has a hole center axis, and wherein a distance between the second attachment surface and the first attachment surface in the first direction increases as the second attachment surface approaches the hole center axis when viewed in a second direction perpendicular to the first direction.

2. The operation lever cover according to claim 1, wherein the second attachment part has a first additional trunk provided between the first attachment surface and the second attachment surface when viewed in the second direction.

3. The operation lever cover according to claim 1, wherein the distance between the second attachment surface and the first attachment surface in the first direction decreases as the second attachment surface approaches the hole center axis when viewed in a third direction perpendicular to the first direction and the second direction.

4. An operation lever cover for a work vehicle, comprising:
 a through hole extending in a first direction, an operation lever of the work vehicle being configured to pass through the through hole;
 a trunk having a bellows shape and surrounding the through hole;
 a first attachment part provided at a first end in the first direction and having a first attachment surface configured to be fitted to a first support surface provided in a driver's cab of the work vehicle, the first support surface having a first support surface opening through which the first attachment part is configured to pass; and
 a second attachment part having a second attachment surface configured to be fitted to a second support surface provided in the driver's cab, the second support surface having a second support surface opening through which the second attachment part is configured to pass, the second support surface opening being separated from the first support surface opening such that the operation lever of the work vehicle is configured to pass through either one of the first support surface opening and the second support surface opening, wherein
 the second attachment part is provided at the first end,
 the trunk has a second end opposite to the first end in the first direction,
 the first attachment part is provided between the second end and the second attachment part in the first direction,
 the first attachment surface is configured to be fitted to the first support surface having a planar shape,
 the second attachment surface is configured to be fitted to the second support surface having a convex shape,
 the through hole has a hole center axis, and
 a distance between the second attachment surface and the first attachment surface in the first direction increases as the second attachment surface approaches the hole center axis when viewed in a second direction perpendicular to the first direction.

5. The operation lever cover according to claim 4, wherein the second attachment part has a first additional trunk provided between the first attachment surface and the second attachment surface when viewed in the second direction.

6. The operation lever cover according to claim 4, wherein the distance between the second attachment surface and the first attachment surface in the first direction decreases as the second attachment surface approaches the hole center axis when viewed in a third direction perpendicular to the first direction and the second direction.

7. An operation mechanism for a work vehicle, comprising:
 a support panel having a first support surface and a second support surface connected to the first support surface, the second support surface being apart from the first support surface;
 an operation lever cover comprising:
  a through hole extending in a first direction;
  a trunk having a bellows shape and surrounding the through hole;
  a first attachment part provided at a first end in the first direction and having a first attachment surface configured to be fitted to the first support surface, the first attachment part being attached to the first support surface such that the trunk excluding the first end is disposed above the support panel in a height direction of the work vehicle; and
  a second attachment part having a second attachment surface configured to be fitted to the second support surface,
  the trunk having a second end opposite to the first end in the first direction,
  the first attachment part being provided between the second end and the second attachment part in the first direction,
  the through hole at the second end having an opening having a substantially rectangular shape when viewed in the first direction;
 a first operation lever passing through the through hole provided in the operation lever cover;
 an additional operation lever cover comprising:
  an additional through hole extending in an additional first direction;
  an additional trunk having a bellows shape and surrounding the additional through hole;
  an additional first attachment part provided at an additional first end in the additional first direction of the additional trunk and having an additional first attachment surface configured to be fitted to the first support surface; and
  an additional second attachment part having an additional second attachment surface configured to be fitted to the second support surface, the additional second attachment part being attached to the second support surface such that the additional trunk excluding the additional first end is disposed below the support panel in the height direction,
  the additional trunk having an additional second end opposite to the additional first end in the additional first direction,
  the additional first attachment part being provided between the additional second end and the additional second attachment part in the additional first direction, the additional through hole at the additional second end having an additional opening having a substantially rectangular shape when viewed in the additional first direction, the additional operation lever cover further comprising a second additional trunk provided on the additional second end of the additional trunk and having an aperture that communicates with the additional opening; and a second operation lever passing through the additional through hole provided in the additional operation lever cover.

8. The operation mechanism according to claim 7, further comprising:

a switch disposed adjacent to the first operation lever and at least partially positioned above the operation lever cover; and an actuation plate connected to the first operation lever and passing through the opening of the through hole at the second end; wherein the actuation plate is shifted when the first operation lever is manipulated, to turn ON or OFF the switch.

9. A work vehicle comprising the operation mechanism according to claim 7.

* * * * *